(12) United States Patent
Nicolet et al.

(10) Patent No.: US 11,579,696 B2
(45) Date of Patent: Feb. 14, 2023

(54) SYSTEM, METHOD AND APPARATUS FOR ACCURATELY MEASURING HAPTIC FORCES

(71) Applicant: MindMaze Group SA, Lausanne (CH)

(72) Inventors: Romain Nicolet, Lausanne (CH); Renaud Ott, Lausanne (CH)

(73) Assignee: MINDMAZE GROUP SA, Lausanne (CH)

( * ) Notice: Subject to any disclaimer, the term of this patent is extended or adjusted under 35 U.S.C. 154(b) by 0 days.

(21) Appl. No.: 17/027,192

(22) Filed: Sep. 21, 2020

(65) Prior Publication Data

US 2021/0255708 A1   Aug. 19, 2021

Related U.S. Application Data

(63) Continuation of application No. 15/933,638, filed on Mar. 23, 2018, now abandoned.

(60) Provisional application No. 62/475,376, filed on Mar. 23, 2017.

(51) Int. Cl.
*G01L 5/22* (2006.01)
*G06F 3/01* (2006.01)
*G01L 5/164* (2020.01)
*G01L 5/1627* (2020.01)

(52) U.S. Cl.
CPC .............. *G06F 3/016* (2013.01); *G01L 5/164* (2013.01); *G01L 5/1627* (2020.01); *G01L 5/22* (2013.01)

(58) Field of Classification Search
CPC ..... G06F 3/016; G01L 1/2206; G01L 1/2262; G01L 5/22; G01L 5/161; G01L 5/164
See application file for complete search history.

(56) References Cited

U.S. PATENT DOCUMENTS

| | | | |
|---|---|---|---|
| 2,697,767 A | 12/1954 | Charles | |
| 2,749,524 A | 6/1956 | Derosa | |
| 4,617,538 A | 10/1986 | Nelson | |
| 4,908,589 A | 3/1990 | Basil, Jr. | |
| 4,945,320 A | 7/1990 | Hettlage | |
| 4,967,170 A | 10/1990 | Hettlage | |
| 5,451,918 A | 9/1995 | Sun | |
| 5,519,253 A | 5/1996 | Lake | |
| 5,563,447 A | 10/1996 | Lake | |
| 6,667,671 B1 | 12/2003 | Speldrich | |
| 9,993,309 B2 * | 6/2018 | Bowling | ............... A61B 90/06 |
| 2013/0068037 A1 | 3/2013 | Siklos | |

(Continued)

OTHER PUBLICATIONS

Gafford et al. "A monolithic approach to fabricating low-cost, millimeter-scale multi-axis force sensors for minimally-invasive surgery," IEEE, 2014 IEEE International Conference on Robotics and Automation (ICRA), pp. 1419-1425, May 31-Jun. 7, 2014) (Year: 2014).

(Continued)

*Primary Examiner* — Suman K Nath
(74) *Attorney, Agent, or Firm* — Graeser Associates International Inc; Dvorah Graeser

(57) ABSTRACT

A low-cost sensor and apparatus comprising same, and a system for measuring force, comprising an end-effector having a first end and a second end on opposing sides of the end-effector; a first sensor located at the first end of the end-effector; and a second sensor located at the second end of the end-effector.

17 Claims, 21 Drawing Sheets

(56) References Cited

U.S. PATENT DOCUMENTS

2018/0024015 A1\* 1/2018 Berme .................... G01L 25/00
73/760

OTHER PUBLICATIONS

Office Action (Notice of Allowance and Fees Due (PTOL-85)) dated Nov. 8, 2021 for U.S. Appl. No. 16/132,551 (pp. 1-9).

\* cited by examiner

| | |
|---|---|
| LENGTH OF THE PROBE | 25 [MM] |
| LENGTH OF THE BEAM | 18 [MM] |
| THICKNESS OF THE BEAM | 1.55 [MM] |
| WIDTH OF THE BEAM | 5 [MM] |
| RADIUS OF THE CENTRAL PLATE | 4.5 [MM] |
| MINIMAL THEORETICAL MEASUREABLE STRAIN AND CORRESPONDING $F_X$, $F_Y$ (GAIN = 600) | 1.51e-6 [-] / 0.03 [N] |
| MINIMAL THEORETICAL MEASUREABLE STRAIN AND CORRESPONDING $F_Z$ (GAIN = 600) | 1.51e-6 [-] / 0.07 [N] |
| MINIMAL THEORETICAL MEASUREABLE STRAIN AND CORRESPONDING $M_Z$ (GAIN = 2750) | 0.60 e-7 [-] / 0.001 [Nm] |

FIG. 16

SYSTEM, METHOD AND APPARATUS FOR ACCURATELY MEASURING HAPTIC FORCES

FIELD OF THE INVENTION

There is provided a system, method and apparatus for accurately measuring haptic forces, and in particular, such a system, method and apparatus which may be used to determine an extent to which such haptic forces should be applied.

BACKGROUND OF THE INVENTION

In the last decades, technological development has made the implementation of haptic devices possible. Indeed, computer performance is very important in order to simulate, through control systems, the feeling of force reaction, also known as haptic feedback. In haptic devices, the user's motion is sent to the control system, which then determines force feedback through its actuators. The flow of information is thus bidirectional, having a manipulator driving the input while physical feedback is expected as the output.

In rehabilitation, it has been shown that robotic automation could help to assist the standard physiotherapist methods. U.S. patent application Ser. No. 15/426,443, owned in common with the present application, describes a robot arm that is actuated to freely move in its workspace and to assist or restrain the motions of the patient during the different phase of training. Indeed, the link between the user's input and the robot's feedback has to be as precise as possible to closely match the sensation of real life situations. The goal is to simulate everyday life exercises without feeling the arm's inertia in order to help patients who suffered from a stroke to recover from upper limb paraplegia. In the worst cases, the robot should also assist the patient motion if its physical condition does not allow him to do so. The use of the robot reduces the physical assistance of a physiotherapist but also allows accurate monitoring of the progress made.

However, currently there are no efficient yet inexpensive sensors which allow sufficiently precise measurements to be made in order for accurate feedback to be provided.

BRIEF SUMMARY OF THE INVENTION

The background art does not provide a system, method or apparatus for providing sufficiently precise measurements for haptic feedback that are efficient yet inexpensive. The present invention, in at least some embodiments, overcomes these drawbacks of the background art and provides such a system, apparatus and method which includes sensors for providing sufficiently precise measurements for haptic feedback that are efficient yet inexpensive.

The sensors may optionally be present at opposing ends or points of an end-effector device, such as a handle for a user to effect force upon, for example by grasping, pushing, pulling, twisting, and the like. The sensors may optionally be based upon, or comprise, a central plate. The central plate may optionally comprise one or more low-cost PCBs (printed circuit boards). The PCB preferably features at least one strain gage, for example implemented as a Wheatstone bridge, against which a force is exerted that corresponds to the force effected upon the end-effector device. Optionally at least two gages are included, at least four gages, at least six gages or any suitable number of gages. The force may be exerted by a probe against the measuring component of the sensor, which may for example include the strain gage. The measuring component of the sensor preferably comprises a plate, such as for example the PCB on which the strain gage (or gages) is mounted.

Preferably the PCB features an X shape, featuring four beams, such that the strain gages are mounted on at least one side of each beam, and optionally on both sides, as described in greater detail below.

One reference describes using PCBs as part of a sensor device, but only for extremely tiny devices (for example, a few millimeters; Gafford, J. B.; Kesner, S. B.; Degirmenci, A.; Wood, R. J.; Howe, R. D.; Walsh, C. J., "A monolithic approach to fabricating low-cost, millimeter-scale multi-axis force sensors for minimally invasive surgery," 2014 *IEEE Int'l Conf. on Robotics and Automation (ICRA)*, pp. 1419-1425, May 31, 2014-Jun. 7, 2014). The reference describes these sensor devices as being desirably very small, as they are intended for use in minimally invasive surgery, where a small size is clearly beneficial. Furthermore, the forces exerted during such minimally invasive surgery would of necessity be relatively small.

By contrast, the present invention, in at least some embodiments, is for sensors that are useful for measuring forces exerted by a user upon an end-effector device. Such forces can be quite large, and it is known in the art that PCB material can be fragile. The present inventors have overcome these drawbacks of using potentially fragile materials, such as PCBs, by including a motion restrictor, for restricting the range of motion exerted by the probe against the measuring component of the sensor.

Optionally, the length of the probe is from 5 mm to 50 mm, and preferably from 15 mm to 35 mm. Optionally the length of the beam is from 5 mm to 50 mm, and preferably from 10 mm to 30 mm. Optionally the thickness of the beam is from 0.5 mm to 5 mm, and preferably from 1 mm to 3 mm. Optionally, the width of the beam is from 0.5 mm to 10 mm, and preferably from 2.5 mm to 7.5 mm. Optionally, the radius of the central plate is from 0.5 to 10 mm, and preferably from 3 mm to 6 mm. Preferably the radius of the central plate is larger than the width of the beam.

BRIEF DESCRIPTION OF THE DRAWINGS

FIGS. 8-16 relate to analytical studies of various systems, including different embodiments and optional parameters.

DESCRIPTION OF AT LEAST SOME EMBODIMENTS

According to at least some embodiments of the present invention, there is provided a system, method and apparatus which is able to obtain the forces applied by the user on an end effector. The end effector may for example optionally be implemented as a handle or any other device that the user is able to contact and to apply force to. To measure such forces, a force sensor is used as part of the system or apparatus, which provides measurements for the method. A force sensor placed close to the handle will avoid crosstalk while a sensor placed further away on a system, such as a cantilevered system for example, could reduce the inertial but mix axial forces and torques leading to wrong interpretation of the signal.

In case of the user placing force on a rotating joint, momentum could be measured directly at the actuated rotating joints. For example, a sensor set close to the cantilevered end of a rotating joint will measure a torque around the X-axis which can be induced either by a linear force along the Z-axis or a torque around the X-axis. The output of the force sensor is preferably representative of the force applied by the user and thus, placing the force sensor as close as possible to the handle or other device physically contacted by the user is more reliable.

According to at least some embodiments, the sensor comprises a cross force sensor. It allows relatively simple measurement of two momentums around the X and Y-axis and one linear force along the Z-axis; optionally a third momentum around the Z-axis can easily be integrated to the sensor system.

Figure 1:
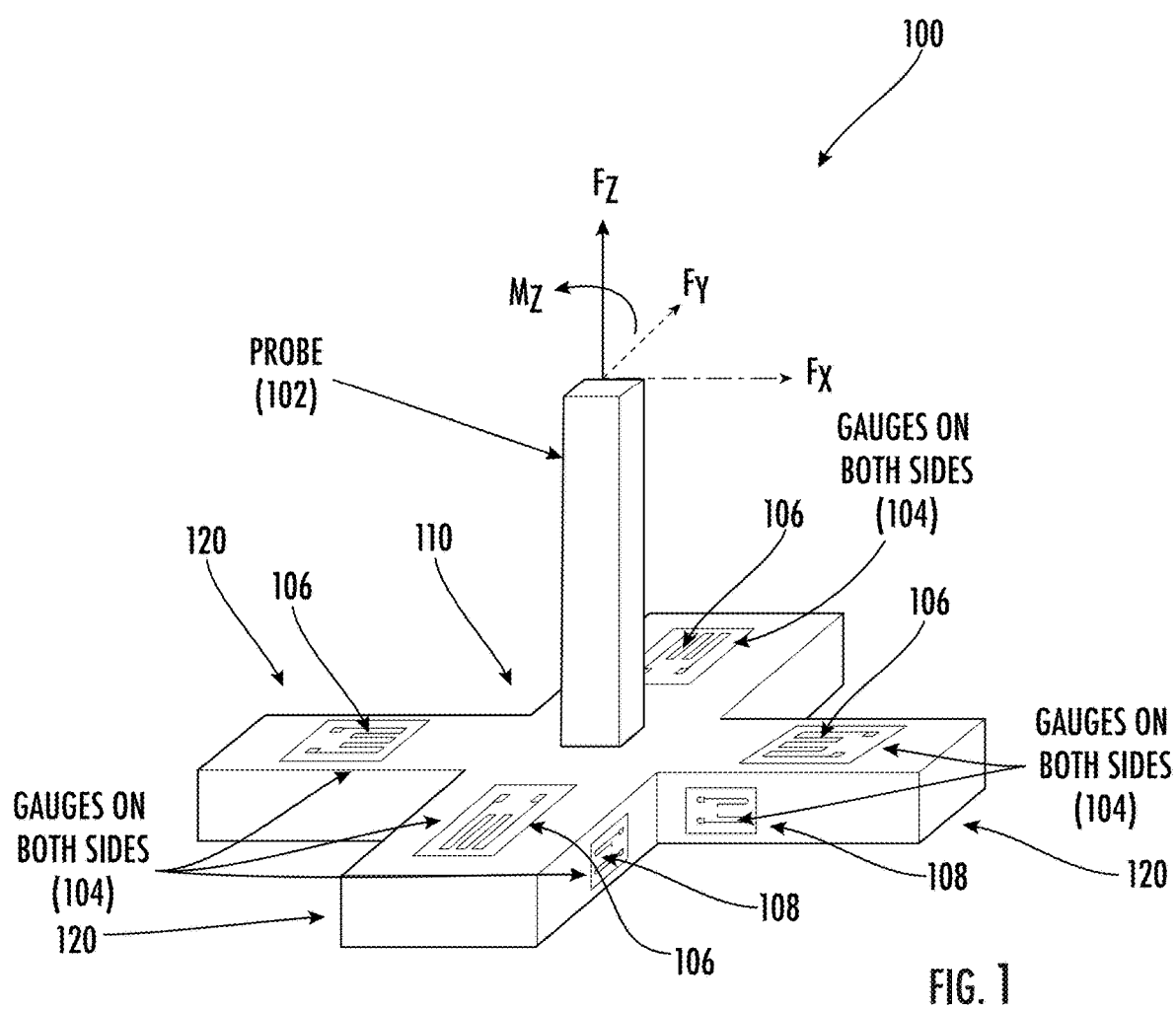
FIG. 1 shows a non-limiting example of such a cross-force sensor, with a local axis and gages that are positioned to measure the 4 components of the force.
Figure 3A:
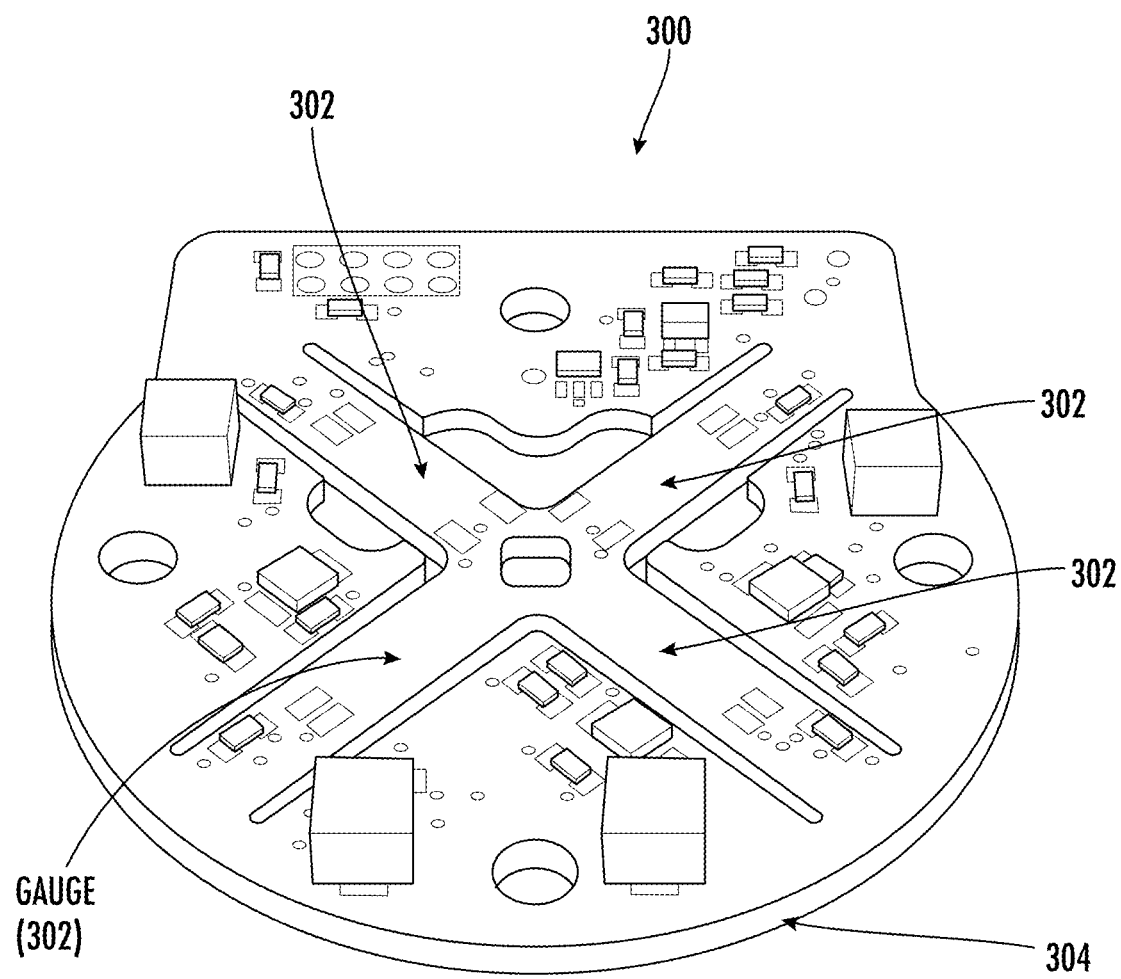
FIGS. 3A-3C show a non-limiting example of a PCB (printed circuit board) implementation of a sensor according to at least some embodiments of the present invention.
Figure 3B:
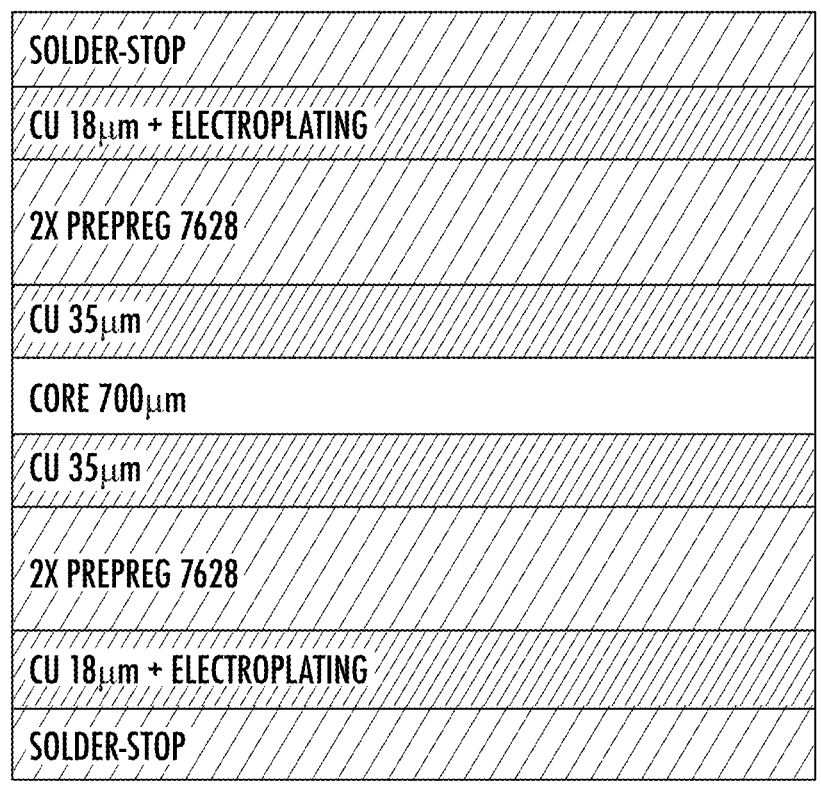
Figure 3C:
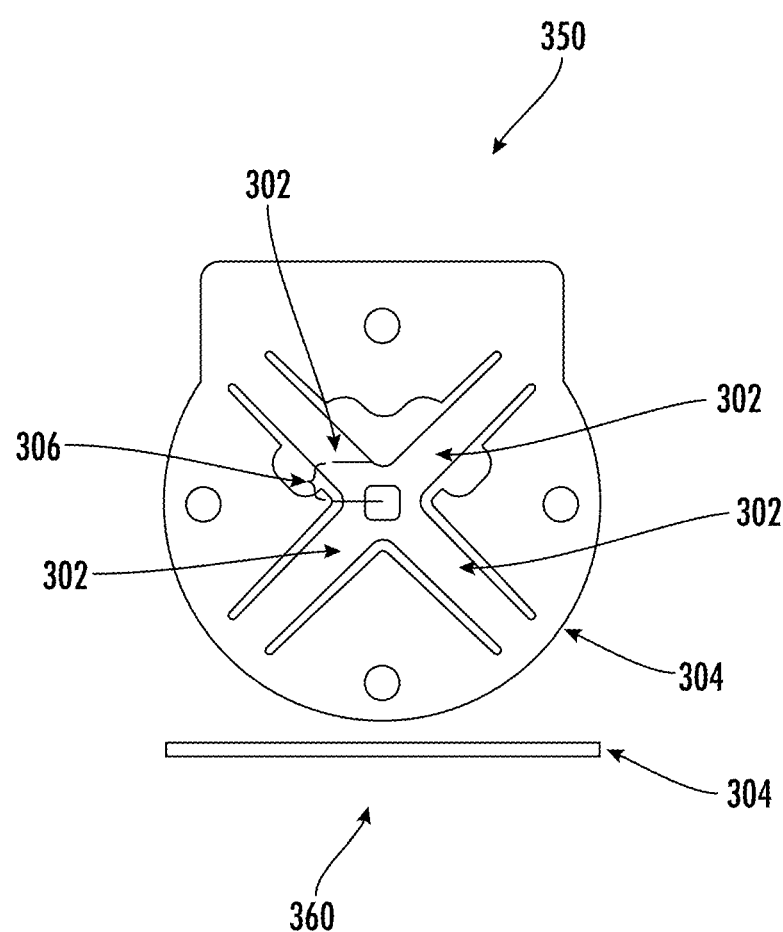

FIG. 1 shows a non-limiting example of such a cross-force sensor 100, with a local axis and gages that are positioned to measure the 4 components of the force. As shown, a sensor 100 features a probe 102 attached perpendicularly to a plate 110. In some embodiments, sensor 100 is only a portion of a sensor plate, for example as shown in FIGS. 3A and 3C. Plate 110 features a plurality of gages 104 for measuring the forces placed on probe 102. Preferably, gages 104 include a plurality of gages 106 on top and bottom of plate 110 and a plurality of gages 108 on sides of plate 110. Gages 106 on the bottom of the plate 110 cannot be seen in FIG. 1. For the purpose of illustration only and without any intention of being limiting, plate 110 as shown includes an "X" formation, with probe 102 in the middle of the X. Each leg of the X may be referred to as a beam 120. Preferably there are four gages 106 on top of plate 110, four on the bottom, two at each beam 120 of the X, and four gages 108 on two separate sides of two beams 120 of plate 110.

Figure 2:
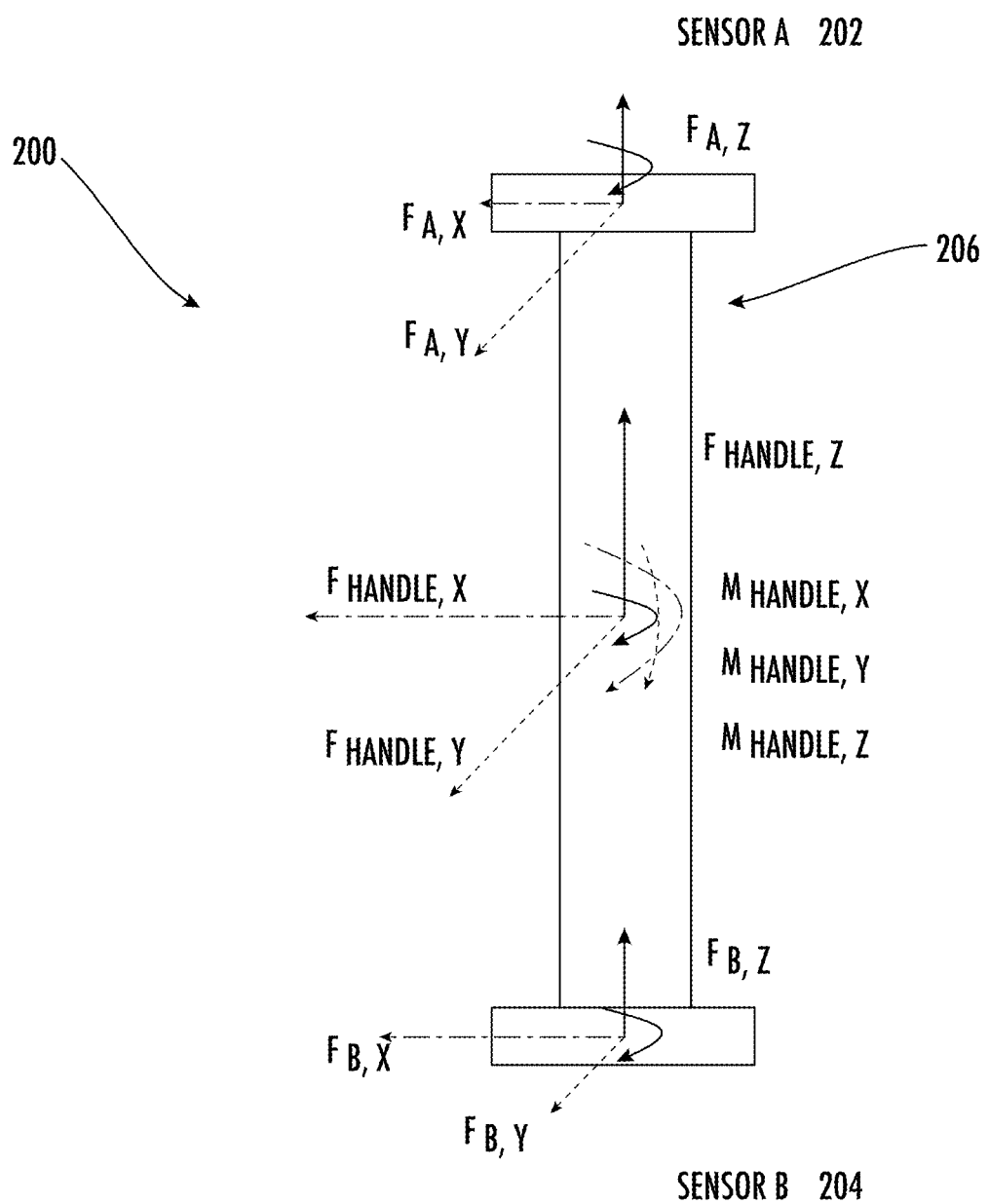
FIG. 2 shows a system 200, featuring a non-limiting, illustrative sensor/end-effector assembly.

From the measurement of the torque around the X and Y-axes, the linear forces applied on the probe 102 can be computed. To measure all six degrees of freedom, two sensors 100 will allow all torques and all forces applied to the center of the end-effector's handle to be measured, as shown in FIG. 2. For this non-limiting example, the end-effector is assumed to be receiving forces from contact with, or manipulation by, a human user. By using two sensors 100, all 6 components can be measured without any cross talk between momentums and forces.

Turning back to the drawings, FIG. 2 shows a system 200, featuring a non-limiting, illustrative sensor/end-effector assembly. System 200 features a plurality of sensors 100, shown as sensor A 202 and sensor B 204. Sensors 202, 204 are in force communication with an end-effector 206, shown as comprising a handle. For example, sensors 202, 204 may optionally be attached to end-effector 206. In terms of forces, featuring two 4-component force sensors 100 leads to 6 components at the center of end-effector 206.

Using two such sensors 100 is preferred over using only a single sensor capable of sensing force in 6 axes. Using one six-axis force sensor placed at the bottom of the handle or other end-effector results in cross talk between the two linear forces and torques over the X and Y-axis. The Z-axis components are not affected because the handle's Z-axis is aligned with the force sensor's Z-axis. If placed in the center of the handle, one such sensor would potentially displace or impede the inner mechanism of the grip location of the handle. Another non-limiting advantage of using two 4-axis force sensors is the cost. An industrial 6-axis force transducer is much more expensive than two 4-axis ones.

FIG. 3A shows a non-limiting example of a PCB (printed circuit board) implementation of a sensor according to at least some embodiments of the present invention. As shown, a sensor 300 features a plurality of gages 302, which are not shown in the figure but whose preferred location on the top of the beams is identified, attached to a PCB 304 which includes the remaining components of the PCB. Again, PCB 304 preferably includes an X-shape formation of beams, with two gages 302 at each beam, or arm of the X, and four additional gages, one on each side of two arms of the X. Gages on the side of the beams are also not shown in FIG. 3A but are shown with their preferred location on the beam in FIG. 1. Gages on the side of beams can be smaller than gages mounted on the top or bottom of a beam given the likely dimensions of the beams, as discussed in connection with FIGS. 8-16. Each such gage 302 is preferably implemented with a Wheatstone bridge, a well-known component for measuring the variation of the resistance of such gages 302 according to strain when force is applied, described in greater detail below. In a preferred embodiment that includes four strain gages forming an X shape, as shown in FIG. 3A, each strain gage arranged substantially parallel to an opposing strain gage and substantially perpendicular to two other strain gages.

PCB implementation solves a number of problems. Without wishing to be limited by a closed list, in order to properly measure the induced strain, the choice of the material where the gages are going to be bonded or mounted on is important. Since the force measurement target is very small, the sensor has to be very sensitive and thus the strain needs to be large even when small forces are applied. On the other hand, the sensor has to withstand large loads and thus the yield stress has to be as large as possible while the Young's modulus has to be the smallest. In other words, the ratio of the Yield strength over the Young's modulus has to be maximized. The material's elasticity has to be well defined in order to give good measurement results.

For example, aluminum is unfortunately too stiff to yield enough strain according to the application of a small amount of force. Plastics such as ABS, even though their yield strength is high and elasticity low, are not an option since their elastic properties are highly non-linear and may strongly vary with time. Furthermore, the conditioning electrical circuits have to be as close as possible to the Wheatstone bridge in order to reduce the wires length and thus the risk of noisy signals. Following this idea, the best-case scenario would be to have all the analogical circuit embedded in the force sensor and thus to amplify the output before sending it to the Analog-Digital Converter (ADC).

According to these considerations, to increase the strain and to reduce the signal's noise, the sensor is preferably implemented on a Printed Circuit Board (PCB) as illustrated in connection with FIG. 3A, thus reducing the Young's modulus and reducing the wiring distances. This also reduces drastically the cost of the sensor compared to industrial ones. FR-4, the material from which PCB's are mainly made, is quite difficult to precisely characterize. PCB's are made from different layers of resin, copper and woven glass fiber. Thus, it is strongly anisotropic and therefore the direction of the fiber has to be well defined while designing and building the PCB itself.

In accordance with the discussion related to FIGS. 8-16 below, the mechanical properties of PCB as used in preferred embodiments are derived using a homogenization method applicable to composites such as the model of Vanyin and Abolinsh as discussed, for example, in Bogdanovich, and Pastore, *Mechanics of Textile and Laminated Composites with Applications to Structural Analysis*, (Chapman & Hall) 1996. These models are made to characterize multi-ply laminates of fibers but it is in this case assumed that the thin layers of copper only create interfaces and that regarding their dimensions, their mechanical influence is negligible. For this material study, the lay-up shown in FIG. 3B is used and based on the data given by multi-circuit-boards.eu, the PCB manufacturer. It is composed of four layers of copper, one core made of FR-4 and tow layers of prepreg basically having the same mechanical properties as FR-4 because, like the core, they are composed of woven glass fiber.

The homogenization of the material lamina is made for two main reasons: (1) to simplify the analytical model where stresses along two directions are considered and (2) to be able to compute the finite element analysis precisely. The independent mechanical properties of the different layers have been mainly found on studies made over PCB material and are described in Table 1 from Beex, "Warpage of Printed Circuit Boards," 2005 (available at http://www.mate.tue.nl/mate/pdfs/5338.pdf):

TABLE 1

Mechanical Properties of the FR-4

|  | Along X-axis | Along Y-axis | Along Z-axis |
| --- | --- | --- | --- |
| Elastic modulus [GPa] | 22.4 | 22.4 | 1.6 |
| Shear modulus [GPa] | 11.0 | 11.0 | 0.7 |
| Poisson ratio [—] | 0.02 | 0.02 | 0.143 |
| Yield strength [MPa] | 65.0 | 65.0 | 65.0 |
| Ultimate tensile strength [MPa] | 320.0 | 320.0 | No information |
| Ultimate compressive strength [MPa] | 550.0 | 550.0 | No information |
| Density [kg/m$^3$] | 1500.0 | — | — |

TABLE 2

Mechanical Properties of the Copper

| Elastic modulus [GPa] | 110.0 |
| --- | --- |
| Shear modulus [GPa] | 41.0 |
| Poisson ratio [—] | 0.34 |
| Yield strength [MPa] | 330.0 |
| Ultimate tensile strength [MPa] | 655.0 |
| Ultimate compressive strength [MPa] | 1090.0 |
| Density [kg/m$^3$] | 8930.0 |

TABLE 3

Homogenized mechanical properties of the PCB used for computation

|  | Along X-axis | Along Y-axis | Along Z-axis |
| --- | --- | --- | --- |
| Elastic modulus [GPa] | 29.0 | 29.0 | 1.6 |
| Shear modulus [GPa] | 13.1 | 13.1 | 1.4 |
| Poisson ratio [—] | 0.113 | 0.113 | 0.35 |
| Yield strength [—] | 65.0* | 65.0* | 65.0* |
| Ultimate tensile strength [MPa] | 320.0* | 320.0* | No information |
| Ultimate compressive strength [MPa] | 400.0** | 400.0** | No information |
| Density [kg/m$^3$] | 1500.0* | — | — |

*Value taken from the FR-4 for the fact that it has the lower value and is in majority in the PCB
**Value taken from an average resin since it has a lower compressive strength than FR-4

According to the different assumptions made to derive the previous mechanical properties, some errors could occur between the physical model and both the analytical and numerical models. This homogenization method is developed for fibers mixed with a resin matrix and, therefore, including layers of isotropic material could lead to inexact prediction. The previous values are of good approximation for the dimensioning of a beam of the sensor.

Optionally, a PCB of 1.55 [mm] standard thickness with four layers of copper is used. Of the four layers, one middle one is dedicated to the ground and the other one to the reference signals such as the 3.3 [V], the 1.65 [V] and the 0.5 [V] to supply the bridges and reference for the amplifier. The top and bottom layers serve to carry the signals and the routing of the bridges circuits in addition, the top layer carried as well the unfiltered 5 [V] power supply.

Returning to FIG. 3A, in accordance with preferred embodiments, gages 302 are located proximate to the center plate of the sensor plate on the beams. Likewise, as illustrated in FIG. 1, gages 108 on the sides of beams are preferably located proximate to the center plate of the sensor plate on the sides of beams. The precise location of the gages can depend on the dimensions of the beams and the type of gages used.

FIG. 3C illustrates exemplary top view 350 and side view 360 of a PCB implementation of a sensor according to at least some embodiments. The central plate radius 306 is shown as extending from the center of the sensor to the edge of a circle whose arc or polygon with a side that intersects with the edge of the portion of the sensor plate at which two beams intersect.

Figure 4A:
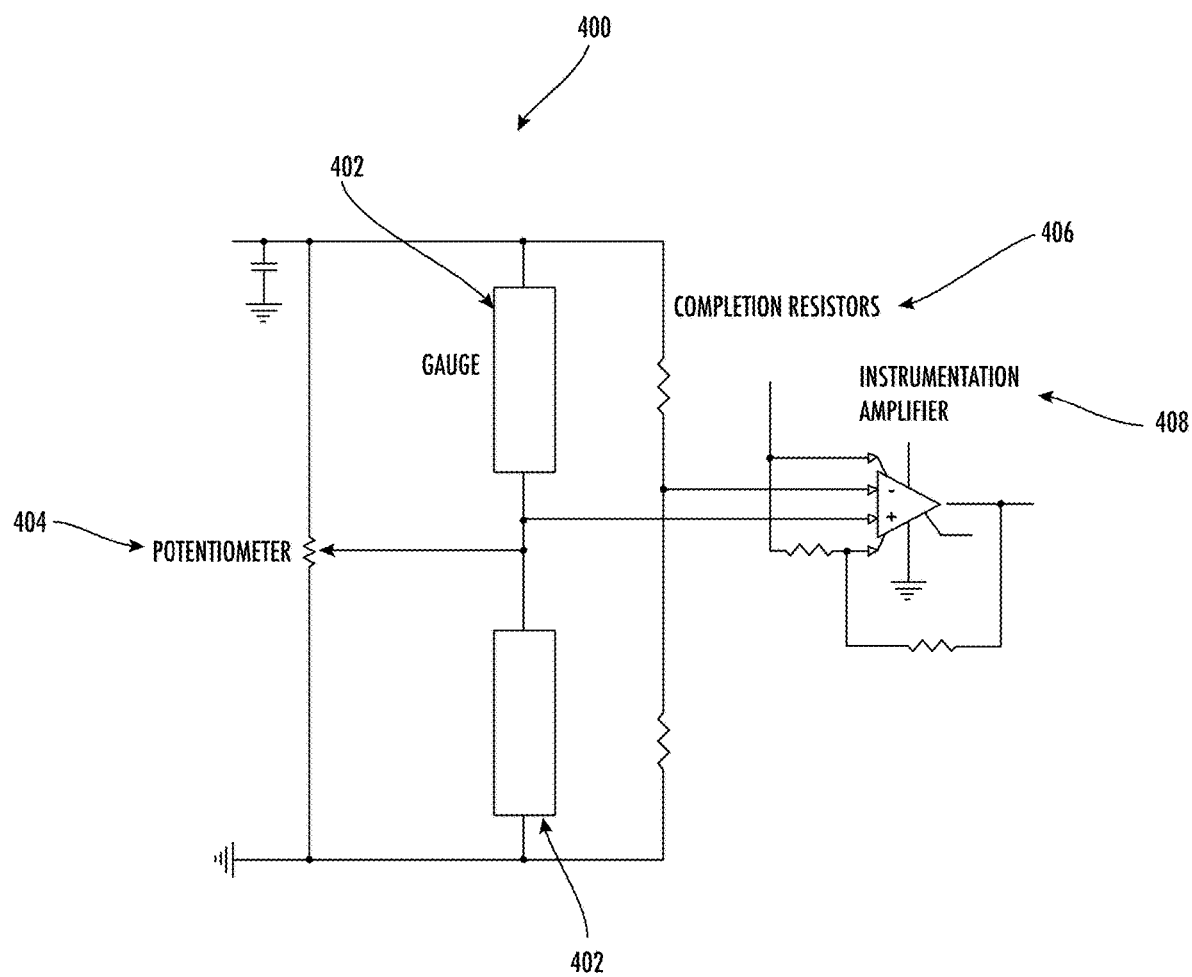
FIGS. 4A and 4B show non-limiting, exemplary implementations of circuits for use with the sensor implementation of FIG. 3A.
Figure 4B:
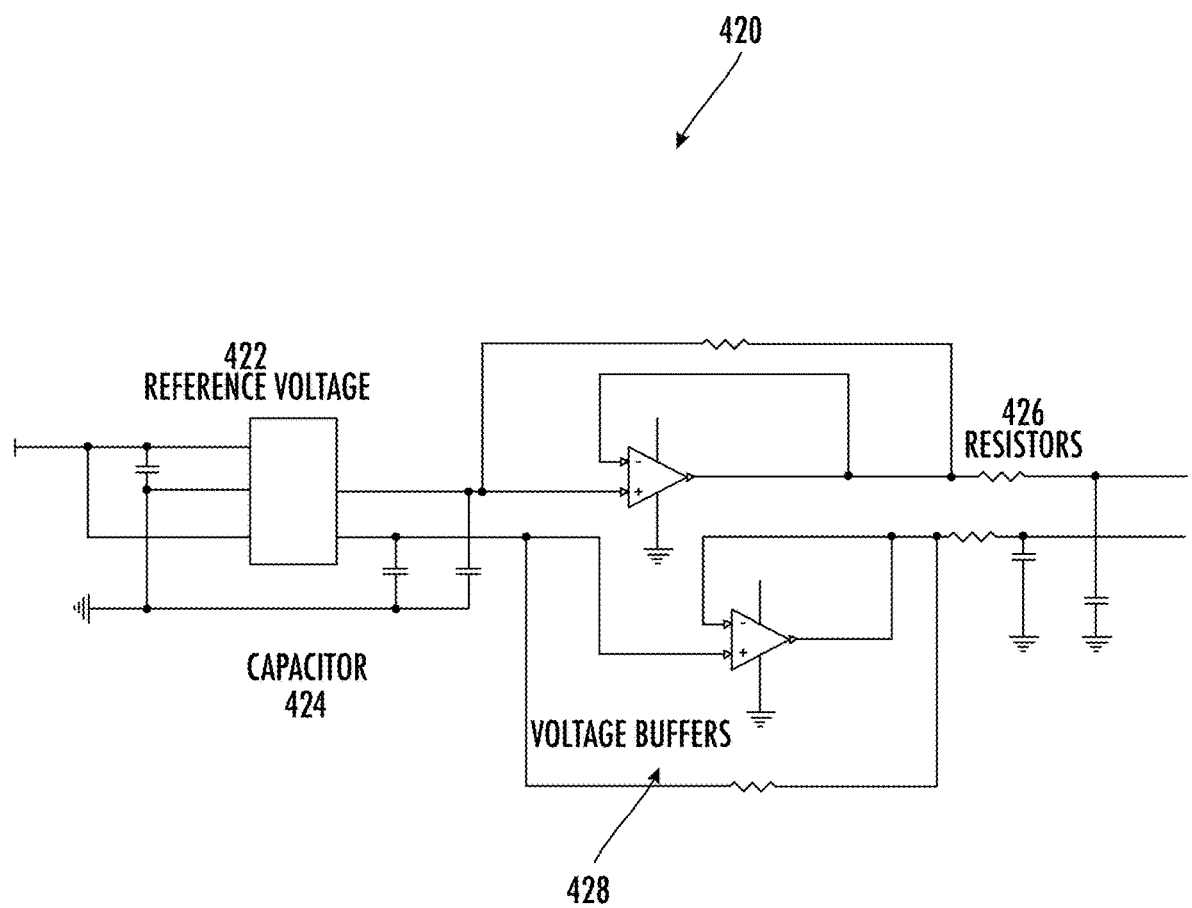

FIGS. 4A and 4B show non-limiting, exemplary implementations of circuits for use with the sensor implementation of FIG. 3A, including the Wheatstone bridge. It can either be a quarter bridge, a half bridge or a full bridge. A quarter bridge means that one of the four resistors composing the bridge is an active strain gage; a half bridge is composed of two active gages and a full bridge of four active gages. Preferably either the half bridge or full bridge implementations are used with embodiments of the present invention as described herein.

While routing the PCB, it is important to take into account the offset of the bridge. Indeed, the precision of the strain gages resistor might not be perfect, but an additional residual variation can be due to imperfect bonding and constraints in the gages. Therefore, it is important to have on the PCB a way to center the Wheatstone bridge at zero. Many different methods exist and may optionally be implemented with the sensor of FIG. 3A.

For example, offset trimming may optionally be performed using a DAC (Digital-to-Analog Converter). It is possible to add a DAC to the circuit and equilibrate it by adding an opposite voltage to the instrumentation amplifier's input. This method has the advantage not to directly affect the bridge itself and can easily be modified using the software, but on the other hand, it requires more wiring and spaces on the PCB. In addition to the internal wiring of the PCB, the DAC compensating each of the five bridges needs to be wired to the control system outside the sensor. This implies 5 more wires running along the arms of the end-effector or other device with which the user interacts, which is not a good alternative when the objective is to minimize the friction and inertia of such a device.

FIG. 4A shows an exemplary implementation of a half Wheatstone bridge, which is a basic circuit used to measure small resistance variations across the beams of the X shape, followed by an instrumentation amplifier to match the Analog to Digital Converter. This implementation does not use a DAC. A Wheatstone bridge circuit 400 features a plurality of gages 402, connected to a potentiometer 404. Within circuit 400, a plurality of completion resistors 406 and an instrumentation amplifier 408 are also present.

Potentiometer 404 and instrumentation amplifier 408 are used together in place of the previously described DAC solution. Potentiometer 404 is added in parallel to the two legs of the bridge 400. By moving the slider of potentiometer 404, the resulting relative resistance of both side of the bridge 400 leads to its equilibrium. This alternative is completely embedded in the sensor and does not require external wiring. Instrumentation amplifier 408 avoids the problem of the gain varying with the absolute load on completion resistors 406 of circuit 400.

Instrumentation amplifier 408 serves to amplify the bridge output and send it out of the sensor.

FIG. 4B shows a conditioning circuit required to filter the voltage that supplies the Wheatstone bridges. A conditioning circuit 420 features a reference voltage 422, a plurality of capacitors 424, a plurality of resistors 426 and a voltage buffer 428. For each reference voltage, one voltage buffer 428 is provided, to avoid having the bridge circuit pull too much current on the reference voltage. As an example, full scale output voltages may be in the 1 mV to 10 mV range and need to be amplified in a data acquisition system to obtain strain measurements.

Figure 5A:
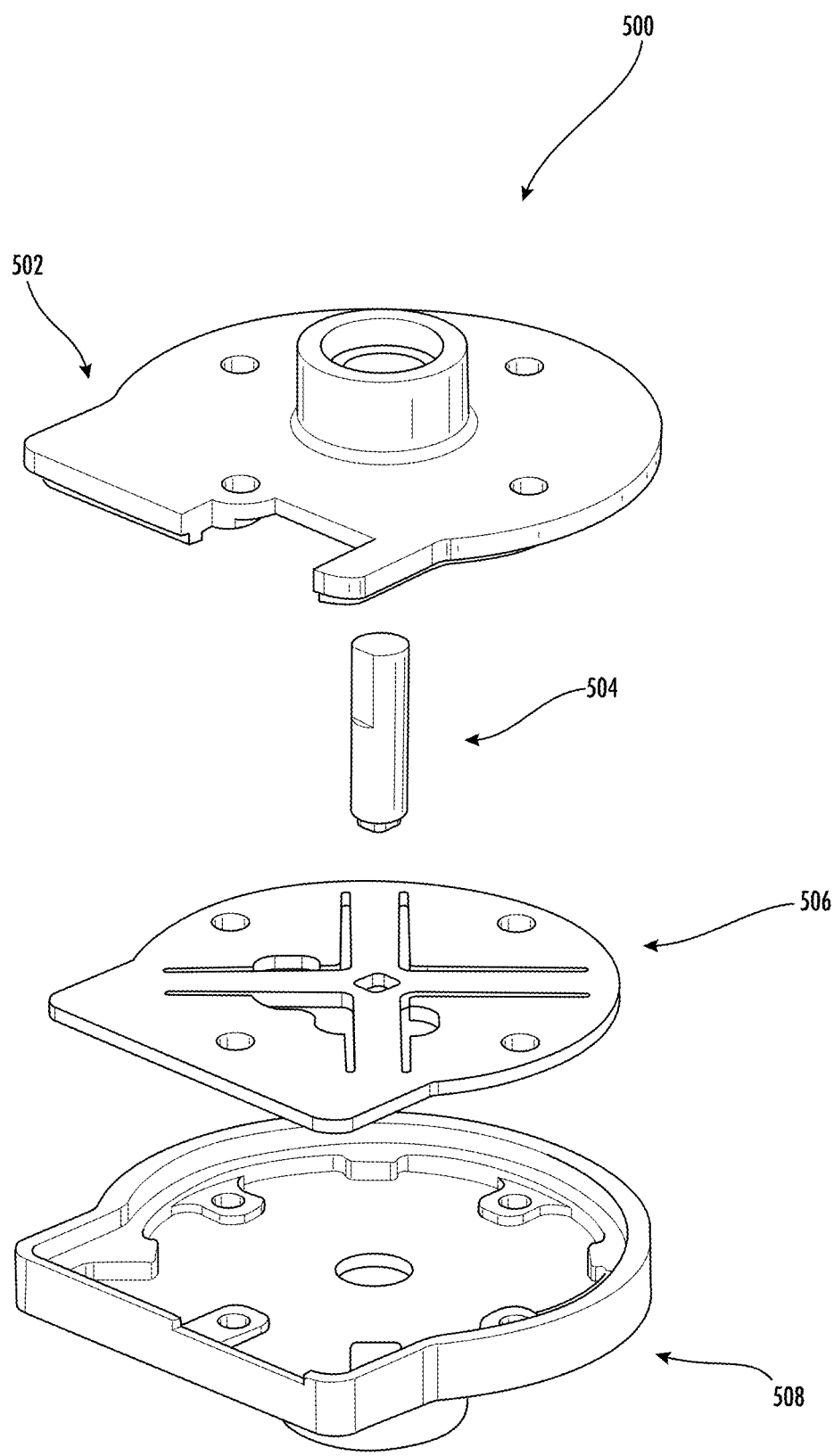
FIGS. 5A and 5B show a non-limiting, exemplary implementation of a structural construction of a sensor according to at least some embodiments of the present invention.
Figure 5B:
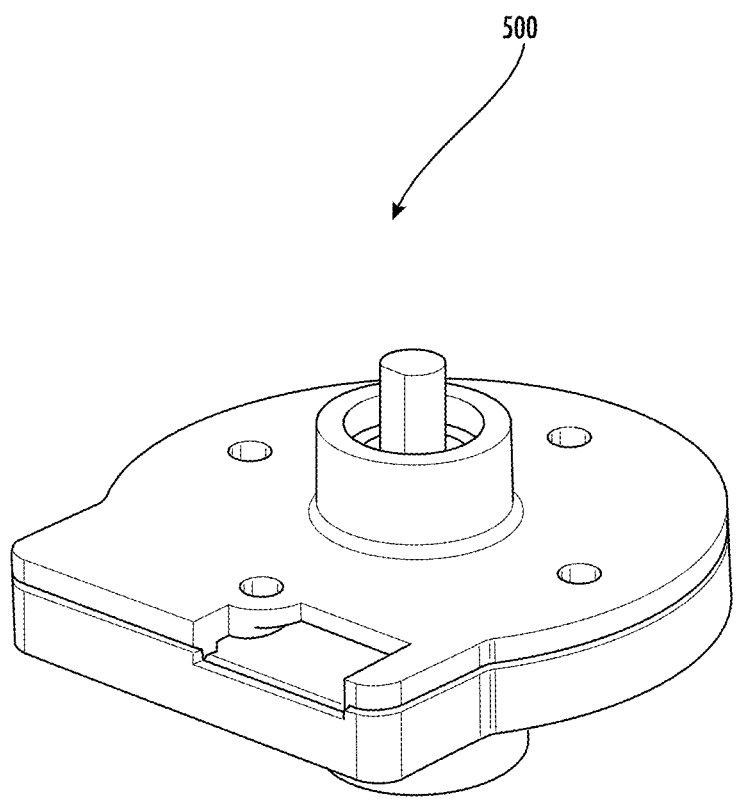

FIGS. 5A and 5B show a non-limiting, exemplary implementation of a sensor assembly according to at least some embodiments of the present invention. FIG. 5A shows a sensor assembly 500 in an exploded view; FIG. 5B shows sensor assembly 500 in a closed view.

Turning back to FIG. 5A, sensor assembly 500 features a cover 502, as the top part of the casing. Cover 502 optionally includes a mechanical stop, described in greater detail below. Next, a probe 504 is used to transfer force on sensor assembly 500 to a sensor 506, which may optionally be implemented as a PCB as previously described. A bottom part of casing 508 completes the assembly.

Figure 6:
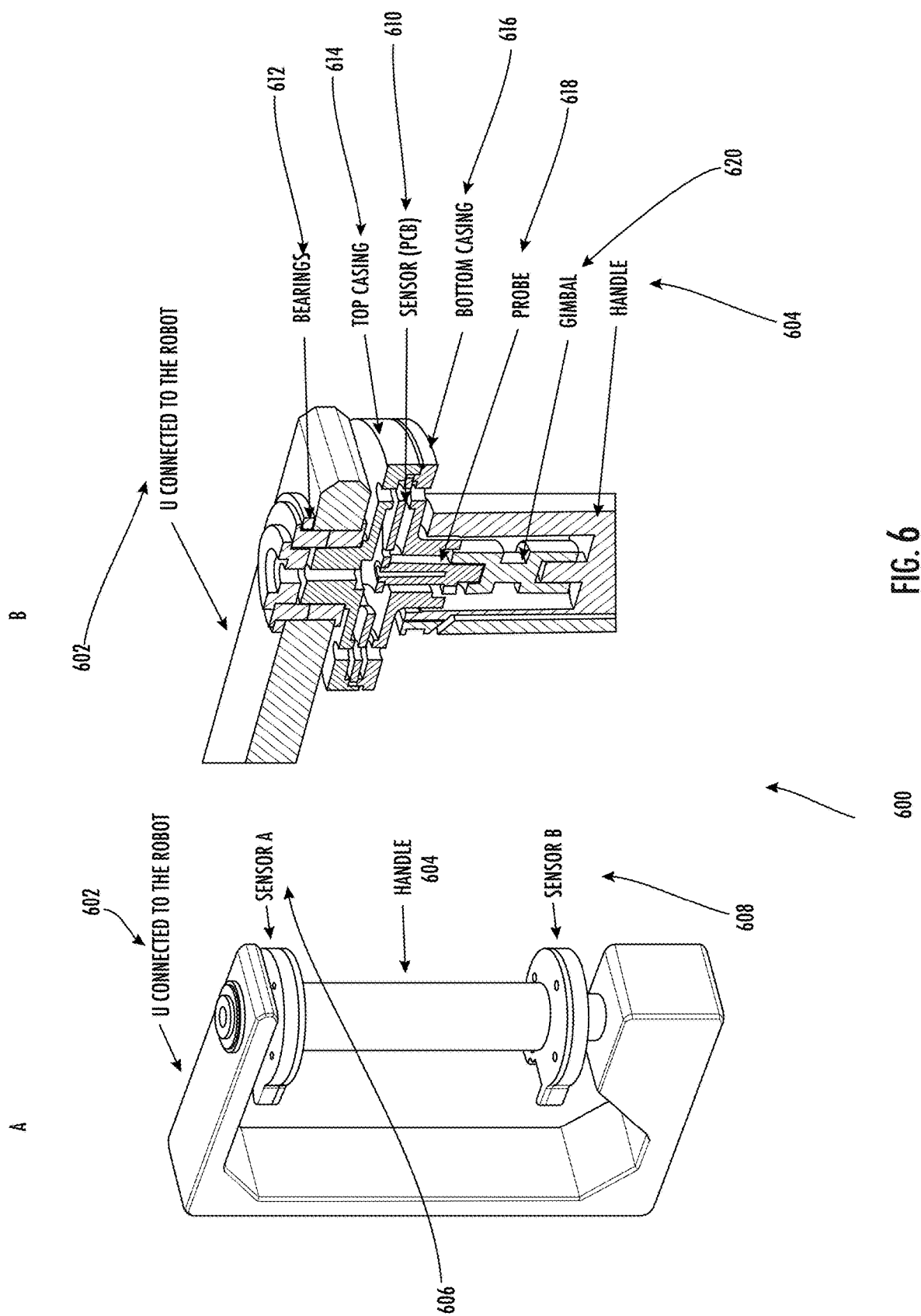
FIGS. 6A and 6B show a non-limiting, exemplary implementation of a structural construction of a sensor and end-effector system according to at least some embodiments of the present invention.

FIGS. 6A and 6B show a non-limiting, exemplary implementation of a structural construction of a sensor and end-effector system according to at least some embodiments of the present invention. FIG. 6A shows sensor and end-effector system in a closed view, while FIG. 6B shows the system in a partial cut-away.

A system 600 features a connector 602, which is a mechanical connector to connect system 600 to some type of robot's end effector or other mechanical, or electromechanical, system. Connector 602 preferably is U-shaped as shown. An end-effector 604, shown as a handle, is connected to a sensor A 606 and a sensor B 608. Preferably, sensor A 606 and sensor B 608 are each connected to an opposite end of end-effector 604.

Turning now to FIG. 6B, a plurality of bearings 612 means that connector 602 is able to rotate about end-effector 604 (or vice-versa). PCB 610 is sandwiched between a top casing 614 and a bottom casing 616. A probe 618 places pressure on PCB 610 according to movement of a gimbal 620, according to a force applied on end-effector 604. Gimbal 620 means that torqueing forces applied on end-effector 604 can be applied to probe 618.

Although the PCB is a fairly sturdy material, it cannot accept unlimited amounts of force. Optionally, some type of stopping system or device may be applied to the probe so that the amount of force applied to the PCB is limited. For example, an O-ring may optionally be used. However, O-rings can undergo non-linear compression which can make calibrating the movement of the probe more difficult, plus the O-ring may not be able to withstand force from the probe sufficiently.

Figure 7A:
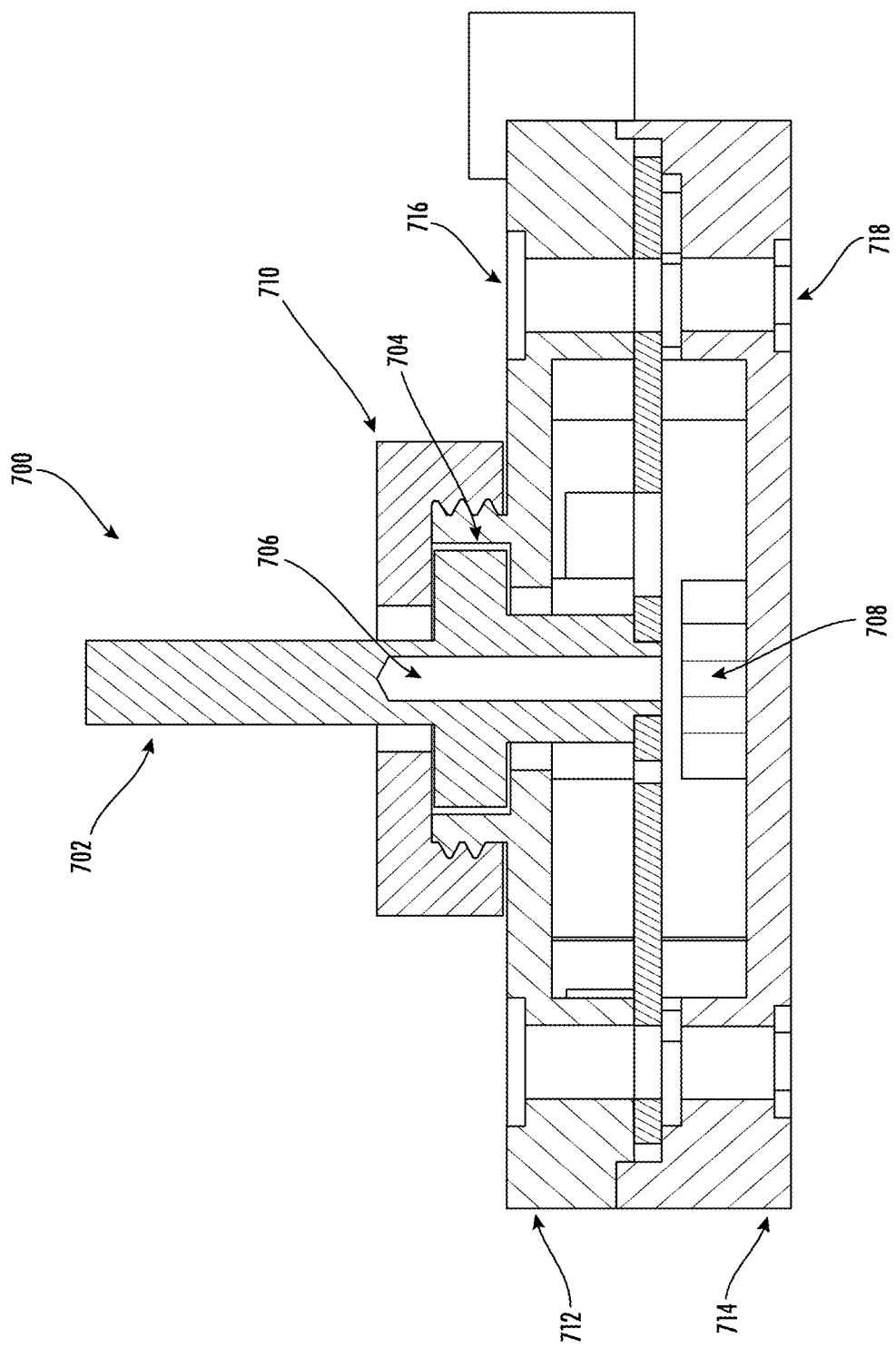
FIGS. 7A and 7B show a non-limiting, exemplary implementation of a structural construction of a sensor and end-effector system with a mechanical stopper according to at least some embodiments of the present invention.
Figure 7B:
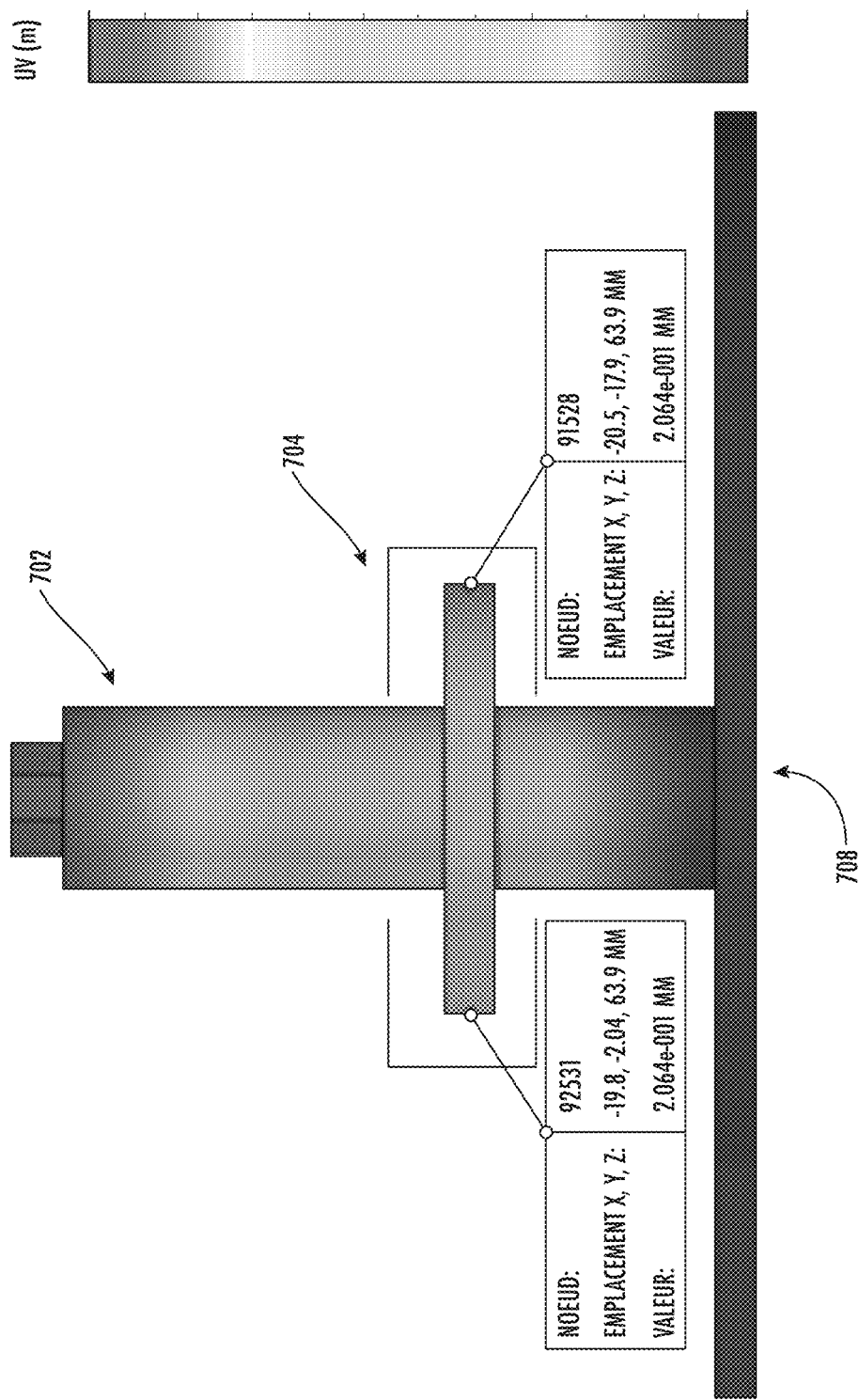

FIGS. 7A and 7B show a non-limiting, exemplary implementation of a structural construction of a sensor and end-effector system with a mechanical stopper according to at least some embodiments of the present invention. As shown in FIG. 7A as a cut-away diagram, a system 700 features a probe 702 which receives force from a gimbal 706. In other embodiments, the probe can receive force from directly from a portion of the end-effector or a connecting component other than a gimbal. The extent to which probe 702 can move, and hence the extent to which probe 702 can apply force to PCB 708, is limited by a mechanical stopper 710, also referred to herein as a motion restrictor. Mechanical stopper 710 contains probe 702 within a chamber 704, such that movement of probe 702 can only occur within the confines of chamber 704. Optionally, chamber 704 features more room on the sides than at the top or bottom as shown, to permit more twisting torque to be applied to probe 702. The dimensions of the chamber 704, or cavity, can depend on the materials used in the sensor plate PCB 708 as well as the dimensions of the sensor plate PCB components including beams.

System 700 is sealed by a top casing 712 and a bottom casing 714, which in turn are bolted together by a top bolt 716 and a bottom bolt 718.

FIG. 7B shows the extent of displacement applied on the force sensor through the probe 702 within the mechanical stop chamber 704, wherein warm colors show a higher displacement and cooler ones show a lower displacement. As shown, the PCB sensor plate 708 as a whole shows no or insignificant movement because it is designed to be stable within the casing. In opposition the probe 702 has a greater deflection and therefore the dimensions of the chamber 704 are greater the further from the PCB.

FIGS. 8-16 relate to analytical studies of various systems, including different embodiments and optional parameters.

In the following analytical development, the following nomenclature is used:

TABLE 4

| | |
|---|---|
| M | Momentum |
| F | Force |
| L | Length |
| b | Width of the beam |
| h | Height of the beam |
| r | Radius of the central plate |

TABLE 4-continued

| | | |
|---|---|---|
| | A | Cross section area |
| | θ | Angle of rotation of the central plate |
| | I | Section modulus |
| | E | Young's modulus |
| | G | Shear modulus |

Figure 8:
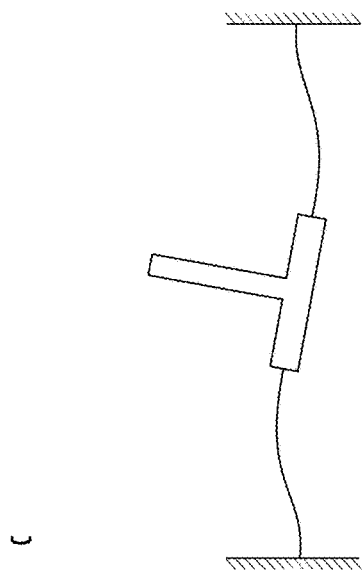
Figure 8:
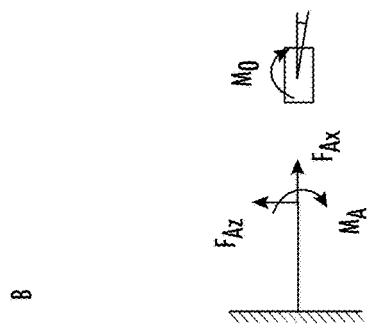
Figure 8:
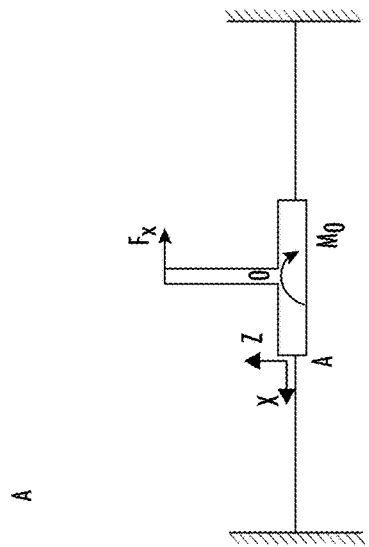

FIG. 8 shows planar force applied on the probe with its deformation, in terms of forces $F_x/F_y$ applied on the probe. The following derived analytical model uses the simplification of symmetry along both axes as shown in FIG. 8.

Thanks to this symmetry, the two momentums $M_x$ and $M_y$ coming from the forces $F_x$ and $F_y$ applied on the probe are derived the same way in the following section:

$$M_0 = \frac{F_x * L_{probe}}{2}$$

$$F_{Ax} = \frac{A_b E_b}{L_{beam}} r\theta^2$$

$$F_{Az} = \frac{12 E_b I_y}{L_{beam}^3}\left(r + \frac{l_b}{2}\right)\theta$$

$$M_A = \frac{12 E_b I_y}{L_{beam}^2}\left(\frac{r}{2} + \frac{l_b}{3}\right)\theta$$

where:

$$I_y = \frac{bh^3}{12}$$

The sum of the moment is equal to zero at equilibrium:

$$\Sigma_M = rF_{Az} + M_A - M_0 = 0$$

Isolating θ, we get:

$$\theta = \frac{F_x L_{probe}/2}{\left[\frac{12 E_b I_y r}{L_{beam}^3}\left(r + \frac{L_{beam}}{2}\right) + \frac{12 E_b I_y}{L_{beam}^2}\left(\frac{r}{2} + \frac{L_{beam}}{3}\right)\right]}$$

It is possible to add to this equation the rigidity of the leg in torsion, which is derived as follows:

$$\theta_{torsion} = \frac{M_0 L_{beam}}{I_g G_b} = \frac{F_x L_{probe}/2}{k_{torsion}}$$

$$k_{torsion} = \frac{I_g G_b}{L_{beam}}$$

where:

$$I_g = \frac{bh}{12}(b^2 = h^2)$$

giving:

$$\theta = \frac{F_x L_{probe}/2}{\left[\frac{12 E_b I_y r}{L_{beam}^3}\left(r + \frac{L_{beam}}{2}\right) + \frac{12 E_b I_y}{L_{beam}^2}\left(\frac{r}{2} + \frac{L_{beam}}{3}\right) + k_{torsion}\right]}$$

The moment at any point along the X-axis is calculated as follows:

$$M(x) = M_0 - xF_{Az}$$

$$M(x) = \frac{12 E_b I_y \theta}{L_{beam}^2}\left[r\left(\frac{1}{2} - \frac{x}{L_{beam}}\right) + l_b\left(\frac{1}{3} - \frac{x}{2L_{beam}}\right)\right]$$

giving the strain for the upper and lower face of the beam:

$$\varepsilon(x, z) = \frac{M(x)h(z)}{E_b I_y} + \varepsilon_{axial}$$

$$\varepsilon_{axial} = \frac{F_{Ax}}{E_b A}(\to 0)$$

$$\varepsilon_{up}(x) = \frac{6h\theta}{L_{beam}^2}\left[r\left(\frac{1}{2} - \frac{x}{L_{beam}}\right) + l_b\left(\frac{1}{3} - \frac{x}{2L_{beam}}\right)\right] + \frac{r\theta^2}{L_{beam}} \cong$$

$$\frac{6h\theta}{L_{beam}^2}\left[r\left(\frac{1}{2} - \frac{x}{L_{beam}}\right) + l_b\left(\frac{1}{3} - \frac{x}{2L_{beam}}\right)\right]$$

$$\varepsilon_{bottom}(x) = -\frac{6h\theta}{L_{beam}^2}\left[r\left(\frac{1}{2} - \frac{x}{L_{beam}}\right) + l_b\left(\frac{1}{3} - \frac{x}{2L_{beam}}\right)\right] + \frac{r\theta^2}{L_{beam}} \cong$$

$$-\frac{6h\theta}{L_{beam}^2}\left[r\left(\frac{1}{2} - \frac{x}{L_{beam}}\right) l_b\left(\frac{1}{3} - \frac{x}{2L_{beam}}\right)\right]$$

This simplification can be done since the terms of higher order tend to zero for small deformation.

Figure 9:
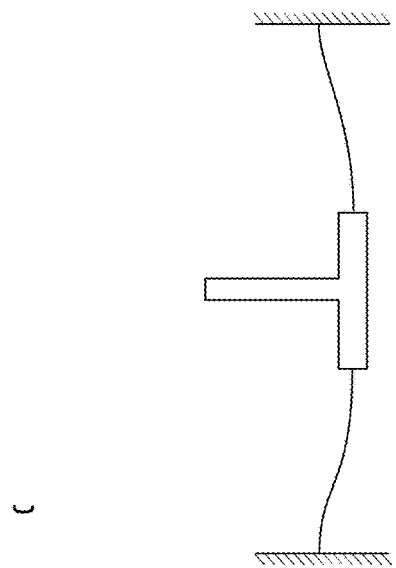
Figure 9:
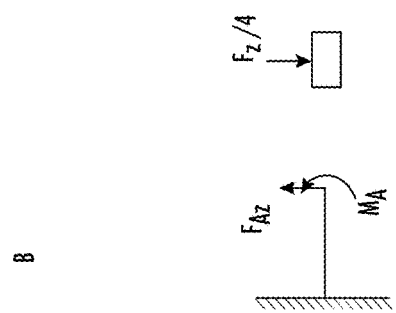
Figure 9:
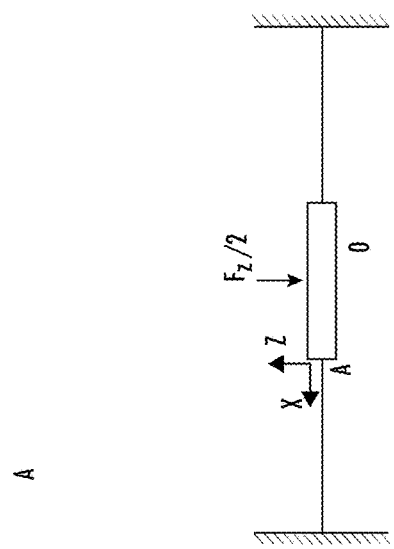

FIG. 9 shows vertical force and its deformation, in which $F_z$ is applied on the probe.

$$F_{Az} = \frac{F_z}{4}$$

$$M_A = \frac{F_z L_{beam}}{8}$$

$$M(x) = \frac{F_z}{4}x - M_A = \frac{F_z}{4}\left(x - \frac{L_{beam}}{2}\right)$$

which leads to the strain along x using:

$$\varepsilon(x, z) = \frac{M(x)h(z)}{E_b I_y} = \frac{\frac{F_z}{4}h(z)\left(x - \frac{L_{beam}}{2}\right)}{E_b I_g}$$

$$\varepsilon_{up}(x) = -\frac{F_z h}{8 E_b I_g}\left(x - \frac{L_{beam}}{2}\right)$$

$$\varepsilon_{bottom}(x) = \frac{F_z h}{8 E_b I_g}\left(x - \frac{L_{beam}}{2}\right)$$

Figure 10:
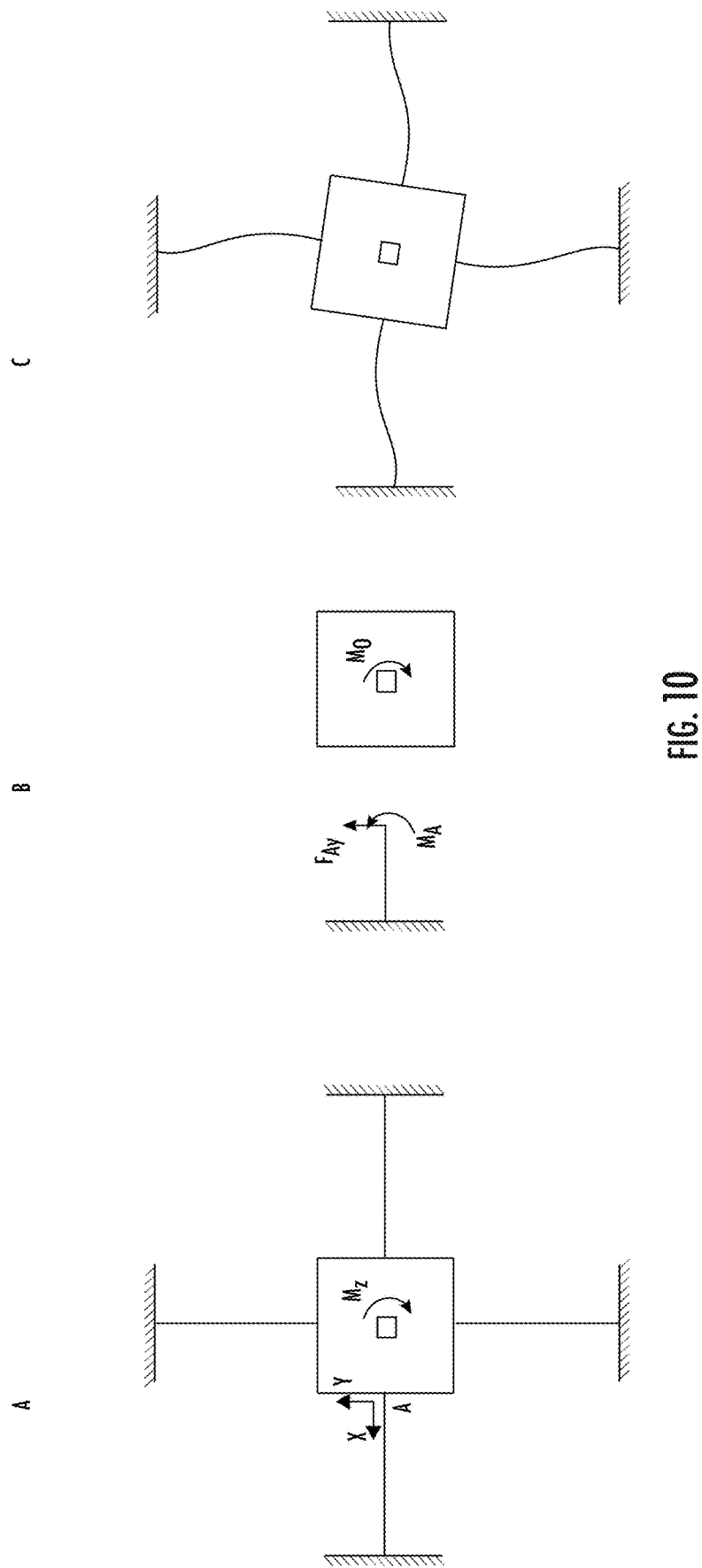

FIG. 10 shows applied torque with its deformation when $M_x$ is applied on the probe. Using the same derivation technique as for $F_x$, it is possible to compute the strain due to $M_z$ each beam.

$$M_0 = \frac{M_z}{4}$$

$$F_{Ax} = \frac{A_b E_b}{L_{beam}} r\theta_{Mz}$$

$$F_{Ay} = \frac{12 E_b I_z}{L_{beam}^3}\left(r + \frac{L_{beam}}{2}\right)\theta_{Mz}$$

$$M_a = \frac{12E_b I_z}{L_{beam}^2}\left(\frac{r}{2} + \frac{L_{beam}}{3}\right)\theta_{Mz}$$

with:

$$I_z = \frac{hb^3}{12}$$

leading to the simplified result since higher order terms tend to zero for small deformations:

$$\varepsilon_{latup}(x) = \frac{6h\theta_{Mz}}{L_{beam}^2}\left[r\left(\frac{1}{2} - \frac{x}{L_{beam}}\right) + L_{beam}\left(\frac{1}{3} - \frac{x}{2L_{beam}}\right)\right] + \frac{r\theta_{Mz}^2}{L_{beam}} \cong$$

$$\frac{6h\theta_{Mz}}{L_{beam}^2}\left[r\left(\frac{1}{2} - \frac{x}{L_{beam}}\right) + L_{beam}\left(\frac{1}{3} - \frac{x}{2L_{beam}}\right)\right]$$

$$\varepsilon_{latbottom}(x) = -\frac{6h\theta_{Mz}}{L_{beam}^2}\left[r\left(\frac{1}{2} - \frac{x}{L_{beam}}\right) + L_{beam}\left(\frac{1}{3} - \frac{x}{2L_{beam}}\right)\right] + \frac{r\theta_{Mz}^2}{L_{beam}} \cong$$

$$-\frac{6h\theta_{Mz}}{L_{beam}^2}\left[r\left(\frac{1}{2} - \frac{x}{L_{beam}}\right) + L_{beam}\left(\frac{1}{3} - \frac{x}{2L_{beam}}\right)\right]$$

The previous analytical model allows a quick parametric study and thus a quick dimensioning of the beams. This model is then improved by the integrating the Wheatstone bridges output predictions directly related to the strain calculated and to the electronic circuit variables. The strain used to compute the output of the bridge is the averaged strain over the length of the gage at its predicted position. This position has been dictated by the dimension of the measuring grid placed where the stress concentrations are the greatest.

In the following, the influences of the different parameters are computed using the analytical model. The parameters tested are the beams' length, thickness and width, but also the radius of the central plate and the length of the probe. All these simulations are performed using the mechanical properties of aluminum. The interesting output is the strain resulting from a force applied either vertically ($F_z$) or horizontally ($F_{x/y}$) since the strain gages measure the deformation of the material. On the graphs of FIGS. 11-16, the minimum measurable strain with a gain of 600 is plotted in dotted red. The following parameters have been tested and their corresponding influence on the strain of the beam is detailed bellow. The aluminium mechanical properties are used and the force applied is 1 [N].

Figure 11:
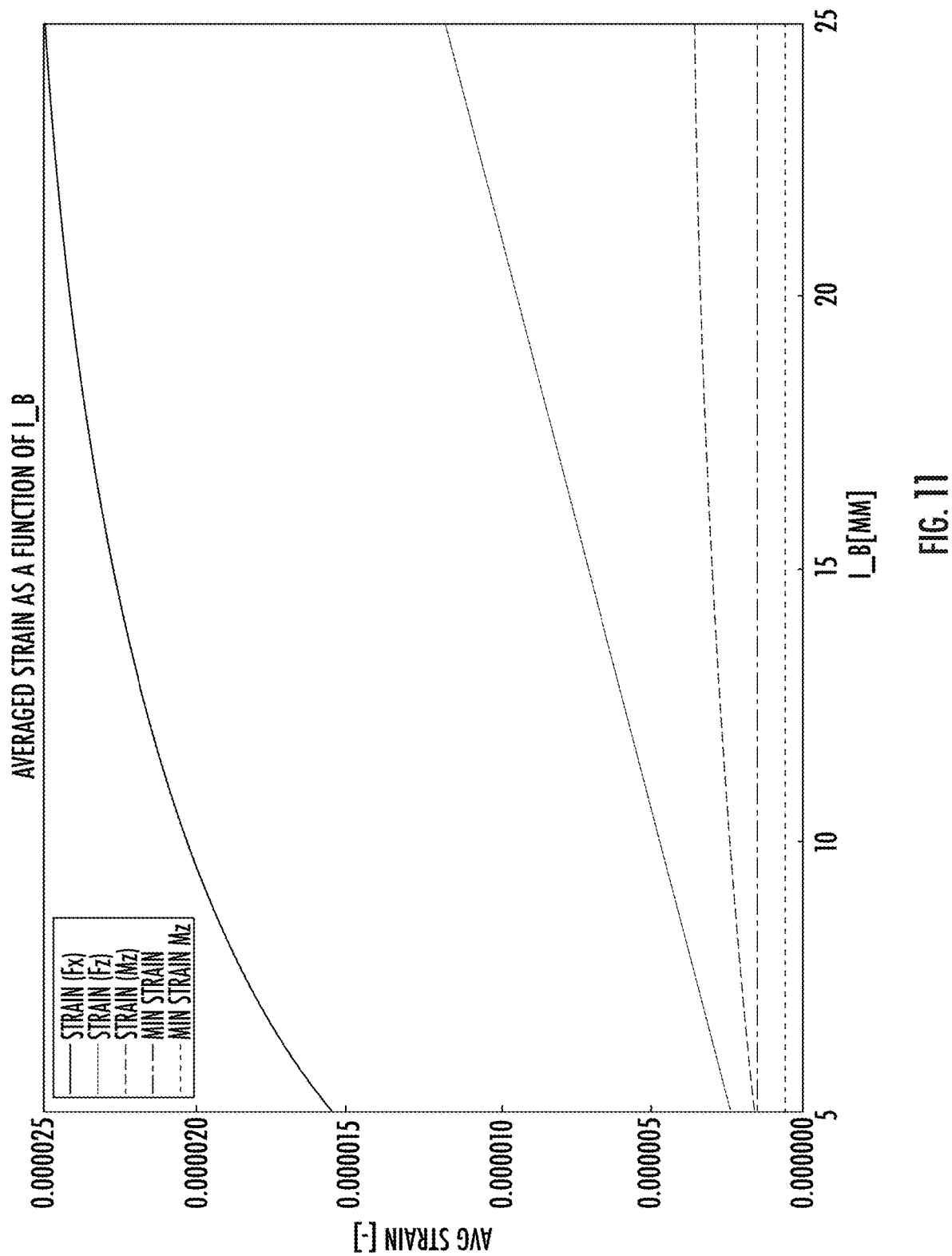
Figure 12:
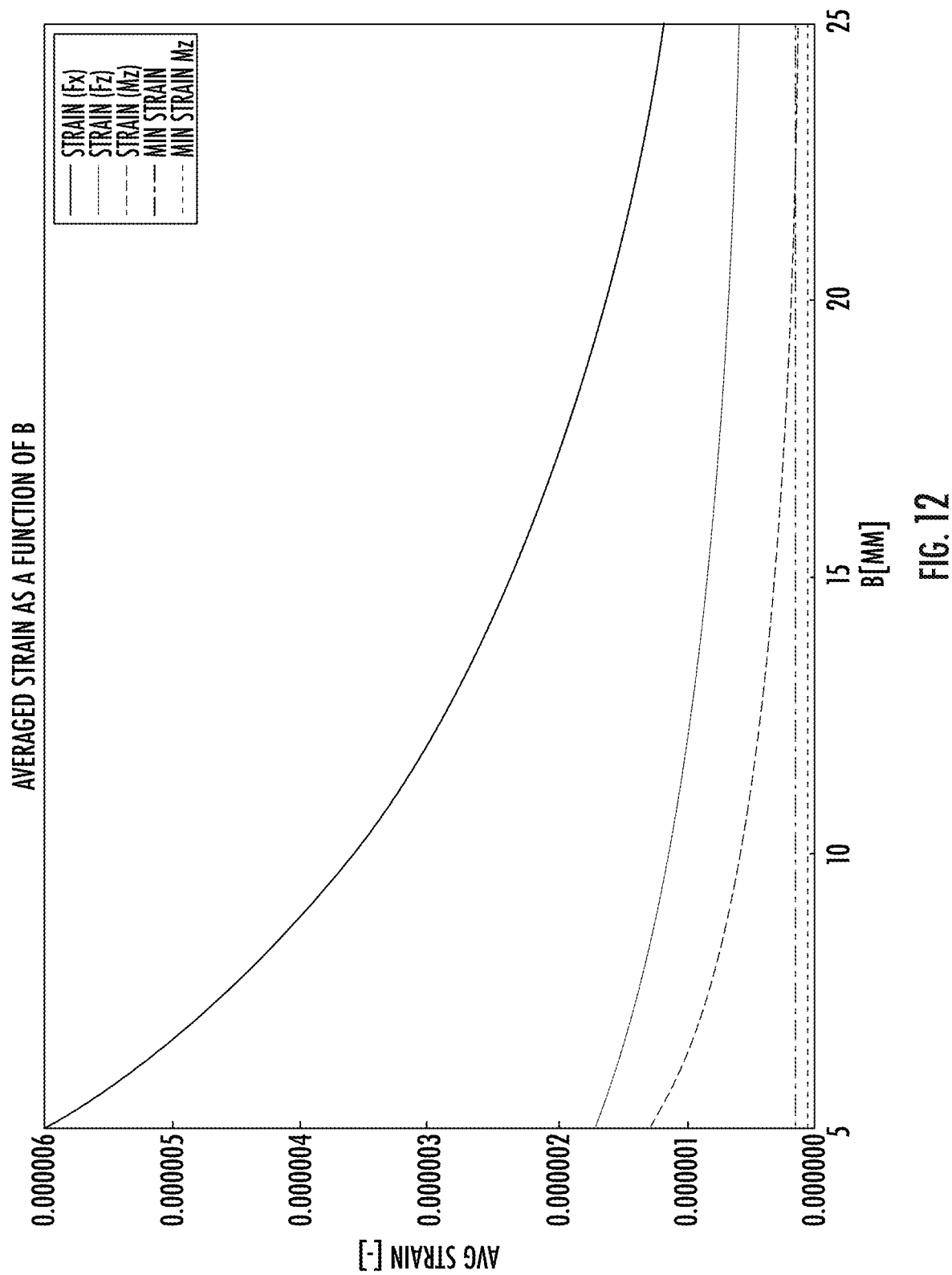
Figure 13:
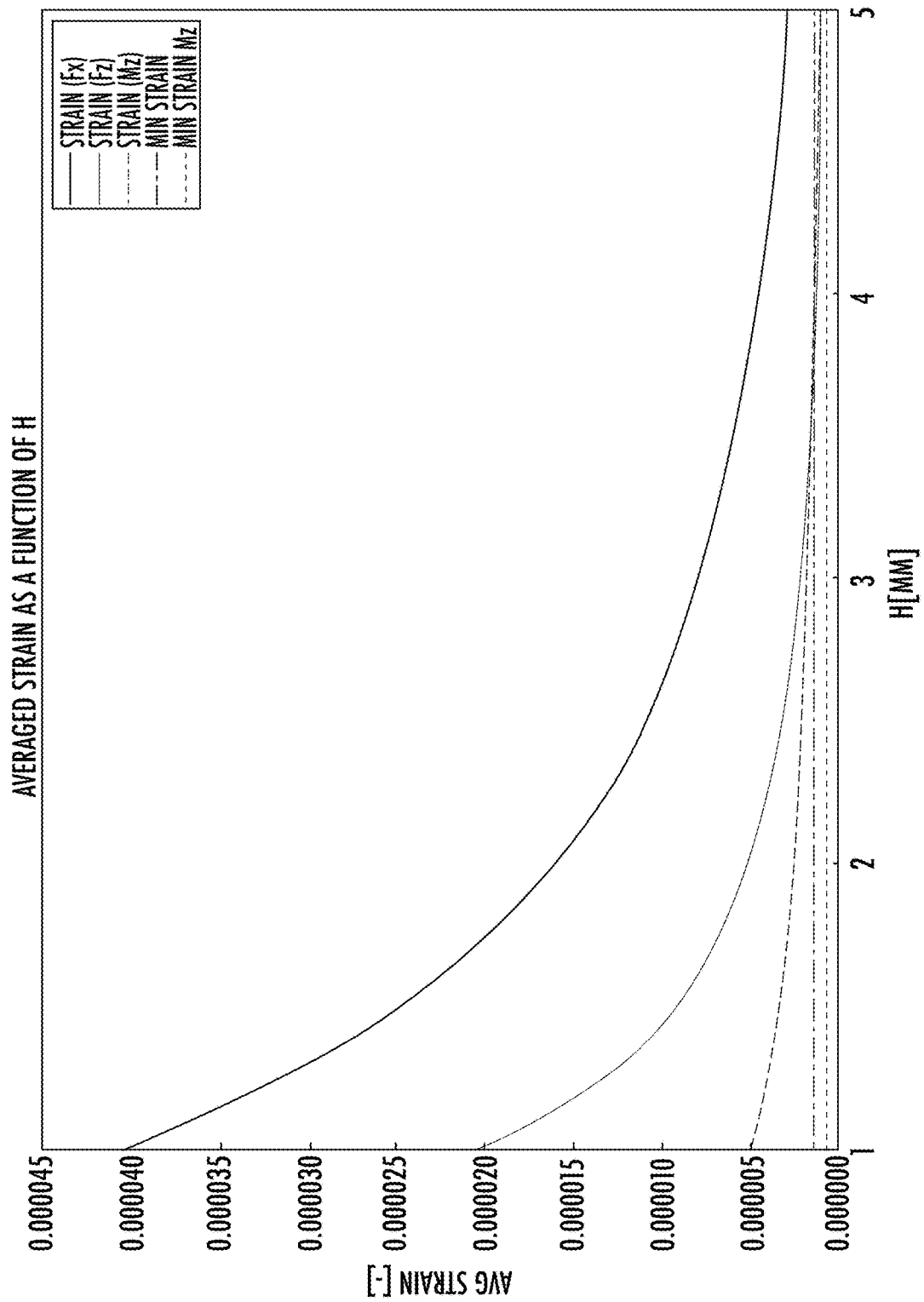

The influence of the length of the beams $L_{beam}$ is shown in FIG. 11, which shows the averaged strain as a function of $L_{beam}$ (length of the beam). The influence of the width of beams is shown in FIG. 12. The influence of the height of the beams is shown in FIG. 13.

Figure 14:
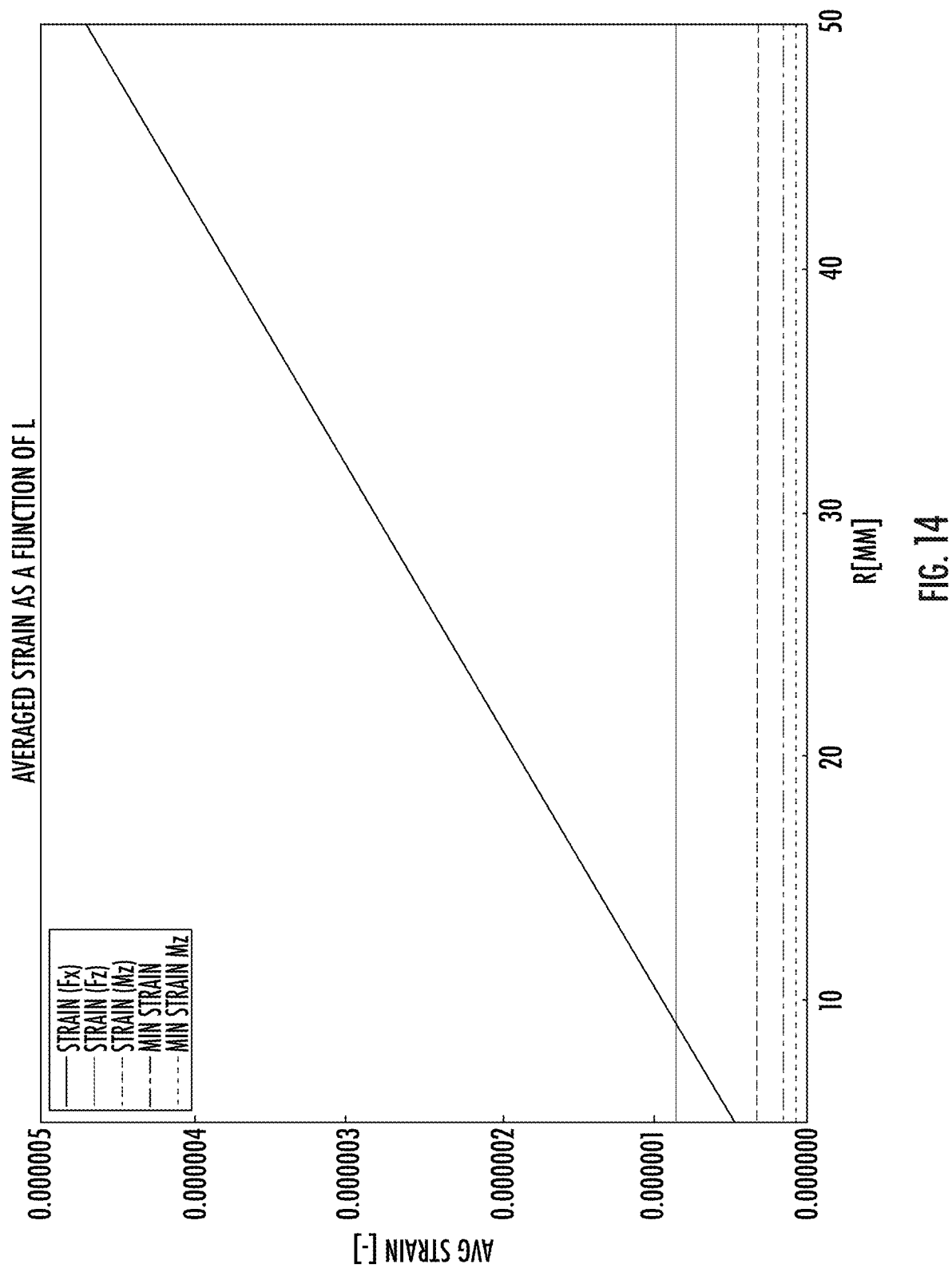
Figure 15:
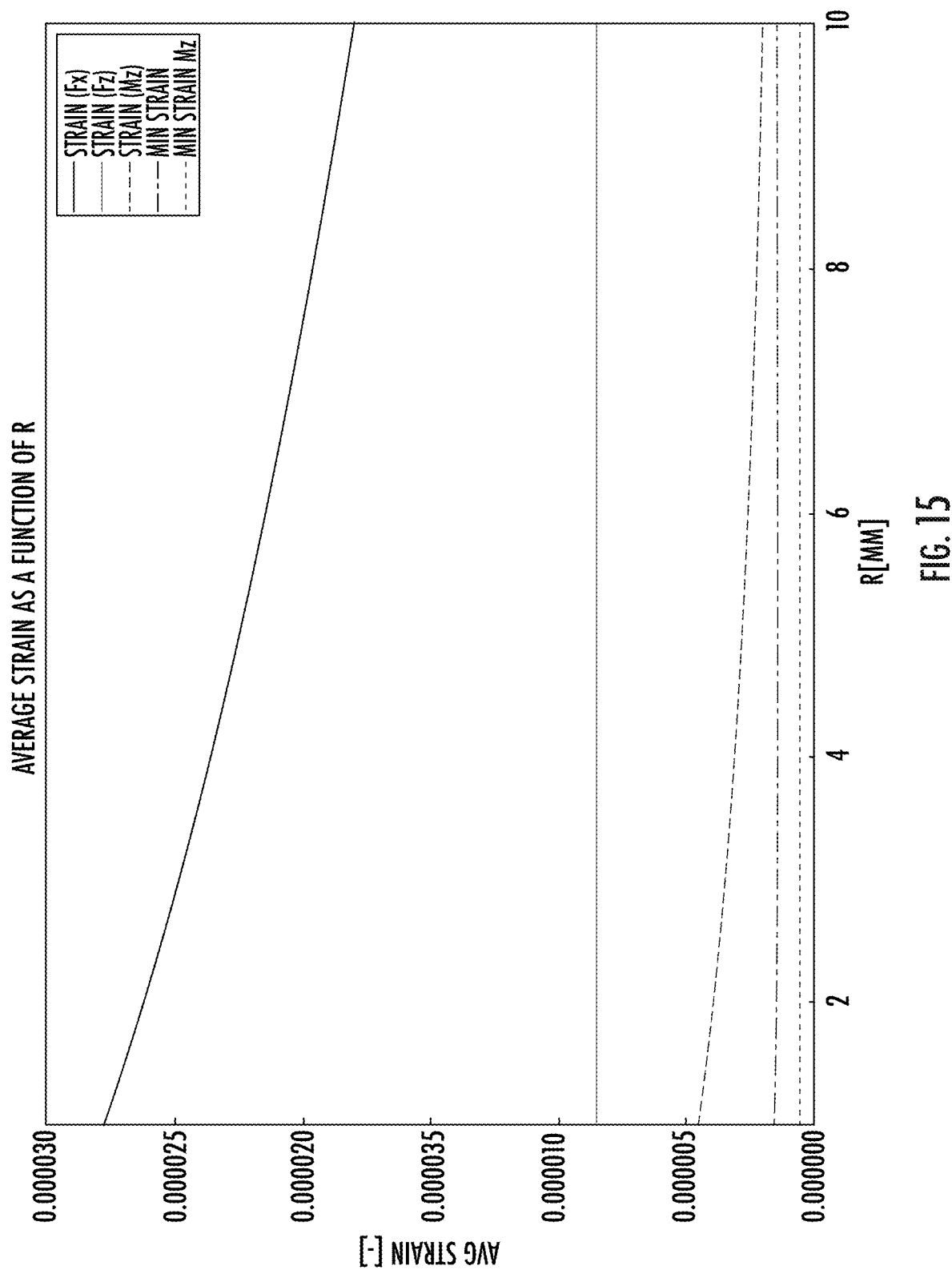

FIG. 14 shows the influence of the length of the probe, while FIG. 15 shows the strain as a function of the central plate's radius (that is, the influence of the radius of the central plate on strain).

According to the parametric study, it is shown that the thickness, the width and radius of the central plate tend to reduce the strain as their dimension increase. On the other hand, the length of the probe and the length of the beams have the opposite influence. The accent is here set on $F_{x/y}$ since the torque $M_z$ has on the handle no resistive torque and is not actuated; this measure is thus not very useful for the control system. From these considerations in addition to the spatial dimensions, it is possible to draw conclusions about the beams' dimensions and the length of the probe. For example, optionally a maximum diameter of the sensor has been set at 6 [cm] while the thickness of the sensor is limited by the available space and a probe length of 2.5 [cm] is chosen. A trade-off is made regarding the sensitivity on $M_z$ and the sensitivity of $F_x$ and $F_y$ since the width and the height directly influence the quadratic momentum in both opposite direction of deformation. The sensitivity of $F_z$ directly correlated to $F_x$ and $F_y$ but due to the four crosses being pulled on the same direction, the system is much more rigid and therefore the sensitivity on $F_z$ is poorer. These considerations led for example to a preferred choice of a PCB over other types of constructions, as previously described.

The full or half Wheatstone bridge output signal related to the strain is implemented in the analytical model leading to the dimensioning of the four legs of the force sensor. The gains are required in the electronic analytical equations and have thus been set at 600 for the half bridges measuring the bending due to $F_x$ or $F_y$ and of 2750 for the bending due to $M_z$. These gains are within a reasonable range allowed by the usual instrumentation amplifier allowing also a post increase of their value if the results are not precise enough. Furthermore, these values of gain are possible by a combination of resistors belonging the E12 normalized resistor series. The analytical model then gives outputs directly related to the analytical strain. Some constraints may be set on the probe length and on the sensor radius (including casing), respectively 25 [mm] and 30 [mm]. The radius of the sensor is the distance from the center of the sensor to the edge of a rounded portion of the sensor. In embodiments that include beams forming an X-shape as part of the sensor plate, the radius is the distance from the portion of the plate at the intersection of the X-shape to the edge of a rounded portion of the sensor. In the case of a sensor that lacks an edge having an arc, the radius can be the distance to an arc that intersects a portion of an edge facet of the sensor. The length of the probe can of course be adapted, if more sensitivity is required for example, it can be elongated. Another optional constraint is the normalized thickness of the PCB of 1.55 [mm]. Optionally the dimensions of the available strain gages may be constrained or at least selected, in order to be able to bond them completely on the beams. Within these ranges, various optional but preferred dimensions are derived from the analytical study, as shown in FIG. 16.

Any and all references to publications or other documents, including but not limited to, patents, patent applications, articles, webpages, books, etc., presented in the present application, are herein incorporated by reference in their entirety.

Example embodiments of the devices, systems and methods have been described herein. As noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and apparatuses which may further include any and all elements from any other disclosed methods, systems, and apparatuses. In other words, elements from one or another disclosed embodiments may be interchangeable with elements from other disclosed embodiments. In addition, one or more features/elements of disclosed embodiments may be removed and still result in patentable subject matter (and thus, resulting in yet more embodiments of the subject disclosure). Correspondingly, some embodiments of the present disclosure may be patentably distinct from one and/or another reference by specifically lacking one or more elements/features. In other words, claims to certain embodiments may contain negative limitation to specifically exclude one or more elements/features resulting in embodiments which are patentably distinct from the prior art which include such features/elements.

What is claimed is:

1. A system for measuring force, comprising:
   an end-effector having a first end and a second end on opposing sides of the end-effector;
   a first sensor located at the first end of the end-effector;
   a second sensor located at the second end of the end-effector;
   a probe configured to receive a force from the end-effector; and
   a motion restrictor configured to restrict the range of motion of the probe;
   wherein the motion restrictor and probe form the sides of a chamber in which movement of the probe can occur.

2. The system of claim 1, wherein the end-effector comprises a handle for grasping by a user.

3. The system of claim 2, wherein the first and second sensors comprise a first plate and a second plate, respectively and the probe is configured to exert a force on the first plate.

4. The system of claim 3, wherein the first plate comprises a PCB (printed circuit board) having mounted thereon at least one strain gage for measuring force exerted by the probe.

5. The system of claim 4, wherein the at least one strain gage comprises a Wheatstone bridge.

6. The system of claim 5, wherein a length of the probe is from 15 mm to 35 mm.

7. The system of claim 5, wherein the first plate comprises four beams substantially forming an X-shape, each of the four beams having a length from 10 mm to 30 mm.

8. The system of claim 7, wherein a thickness of each of the four beams is from 1 mm to 3 mm.

9. The system of claim 7, wherein a width of each of the four beams is from 0.5 mm to 10 mm.

10. The system of claim 9, wherein the width of each of the four beams is from 2.5 mm to 7.5 mm.

11. The system of claim 7 wherein a radius of the first plate is from 0.5 mm to 10 mm.

12. The system of claim 11, wherein the radius of the first plate is from 3 mm to 6 mm.

13. The system of claim 7, wherein a first strain gage is mounted on a first beam of the four beams, a second strain gage is mounted on a second beam of the four beams, a third strain gage is mounted on a third beam of the four beams, and a fourth strain gage of a fourth beam of the four beams.

14. The system of claim 13, wherein the first strain gage and the second strain gage are located substantially on the same plane and substantially in line and the third strain gage and fourth strain gage are substantially on the same plane and substantially in line.

15. The system of claim 14, further comprising a fifth strain gage mounted on a side of the first beam of the four beams and located on a plane substantially perpendicular to the plane on which the first strain gage is located and a sixth strain gage mounted on side of the second beam of the four beams and located on a plane substantially perpendicular to the plane on which the second strain gage is located.

16. The system of claim 1, further comprising a first cover and a second cover forming at least a portion of a casing, such that the first sensor is located between the first cover and the second cover and the probe protrudes from the first cover.

17. The system of claim 16, wherein the first cover comprises the motion restrictor.

* * * * *